United States Patent [19]

Shwayder

[11] Patent Number: 4,466,533
[45] Date of Patent: Aug. 21, 1984

[54] BLADE EDGE WEAR CLIPS

[76] Inventor: Warren M. Shwayder, 2335 E. Lincoln, Birmingham, Mich. 48008

[21] Appl. No.: 431,321

[22] Filed: Sep. 30, 1982

[51] Int. Cl.³ .............................................. B65G 33/26
[52] U.S. Cl. ..................................... 198/676; 198/677
[58] Field of Search ....................... 198/676, 664, 677; 494/54

[56] References Cited

U.S. PATENT DOCUMENTS

| | | | |
|---|---|---|---|
| 3,764,062 | 10/1973 | Brautigam | 494/54 |
| 3,937,317 | 2/1976 | Fleury, Jr. | 198/676 |
| 3,977,515 | 8/1976 | Lewoczko | 198/677 |
| 4,223,601 | 9/1980 | Knuth et al. | 198/676 |
| 4,328,925 | 5/1982 | Shapiro | 494/54 |

FOREIGN PATENT DOCUMENTS

| | | | |
|---|---|---|---|
| 3006101 | 8/1981 | Fed. Rep. of Germany | 198/676 |
| 132985 | 10/1979 | Japan | 198/676 |
| 89128 | 7/1980 | Japan | 198/676 |

*Primary Examiner*—Joseph E. Valenza
*Assistant Examiner*—Daniel R. Alexander
*Attorney, Agent, or Firm*—Cullen, Sloman, Cantor, Grauer, Scott and Rutherford

[57] ABSTRACT

Wear clips for protecting the edges of auger-type blades and similarly curved blade edges, are formed of steel channels filled with a matrix of irregular shaped and sized, small, hard carbide particles and a soft, ductile, brazing material. The clips are arranged in an end-to-end row with a slight gap between each adjacent pair. The clips are welded to the blade and to each other. Breakage of the brittle carbide particles and of the matrix, due to impact forces, is avoided due to relative movement of the particles within the surrounding brazing material under impact loads. The clip channel may be made of a flattened tube which is filled with the matrix and then cut into short clip lengths. Thus, the exposed surface of the tube, which temporarily forms an integral cover for the channel, is rapidly worn away by abrasion during use of the blade, to expose the matrix.

9 Claims, 10 Drawing Figures

BLADE EDGE WEAR CLIPS

BACKGROUND OF DISCLOSURE

Large, screw-like augers are used to feed broken or crushed glass, through a trough or tube, into a glass melting furnace. The auger blade is subjected to intense abrasive action by the conveyed material and in addition, is subjected to impacts or sudden forces due to further crushing of larger pieces of glass by the auger blade. Thus, the forward surface or lead surface of the blade, particularly at the area along the edges thereof, tends to rapidly wear away and require replacement of the auger.

In the past, the wear has been reduced by applying a bead or strip of hard carbide material, such as tungsten carbide or the like, brazed along the edge of the blade. This material prolongs the life of the blade by resisting wear. However, the strip or bead is susceptible to breaking off or breaking up due to the brittleness of hard tungsten carbide and similar hard carbides as well as due to the sudden shock loads that are locally applied from time to time.

A similar type of problem exists in other places where augers are used for conveying or for crushing abrasive materials. Because the blade edge is curved, and is susceptible to heavy abrasion and sudden impact loads, a reliable protective edge material is needed for these applications, as well as for applications where other types of curved blades are subjected to the same kinds of destructive forces.

Thus, the invention herein relates to an improved edge protective strip which has greater abrasion wear resistance and more particularly, substantially increased resistance to breakage than the prior strips.

SUMMARY OF INVENTION

The invention herein contemplates forming a protective edge strip on a curved blade, such as an auger type of blade, by means of aligning, end-to-end, a large number of small size, flat, clips or blocks which are welded to the blade surface and to each other. These clips are formed of flat channels which are filled with a matrix made of hard carbide material surrounded by and imbedded within a soft, ductile, somewhat resilient brazing material. The exposed matrix surface provides a wear resistant coating for the blade. The matrix resists impact forces which otherwise tend to break or dislodge the brittle carbide particles, due to some relative movement of the particles under impact forces and the yielding and force absorption effects of the brazing material.

It is further contemplated to form the clips either in the form of open channels having flat bases with integral, short legs, or alternatively out of flat tubes which in essence, provide a channel with an integral cover. In either case, strips are preferably made up and then cut into short lengths to provide roughly square clips which can be arranged in a row, end-to-end, along the curved surface and appropriately aligned with the edge of the surface. Weld material in the gaps between the clips not only secure the clips to the blade, but also provide end walls to hold each clip matrix in place.

An object of this invention is to provide a simplified system for forming a superior wear and impact resistant strip which includes numerous, small size clips that are easily handled and secured in place. Thus, assembly of a strip upon a curved blade is accomplished merely by welding. The clips themselves are easily fabricated and handled.

A further object of this invention is to provide several alternative systems for forming the clips, each of which is relatively inexpensive, produces a rugged construction, and does not require close tolerances or special care in handling.

These and other objects and advantages of this invention will become apparent upon reading the following description, of which the attached drawings form a part.

DETAILED DESCRIPTION

Figure 1:
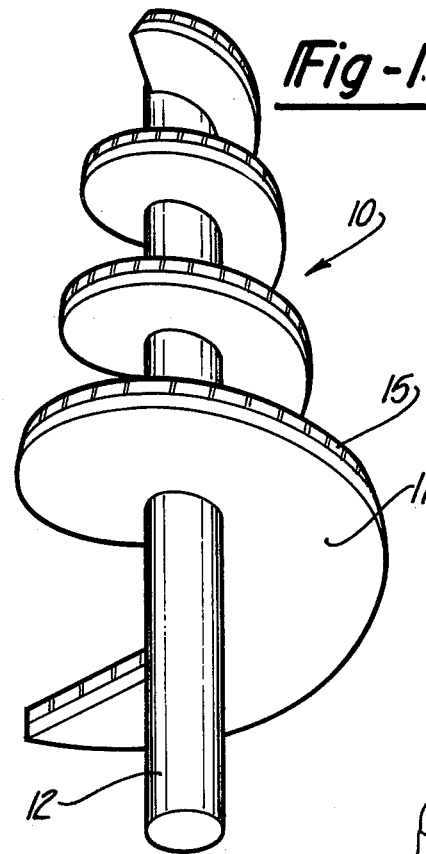
FIG. 1 is a perspective view of an auger having the wear clips of this invention secured to its blade.
Figure 2:
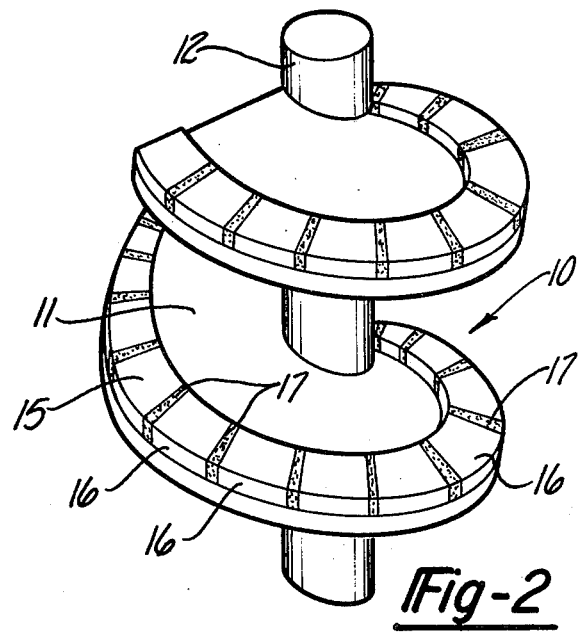
FIG. 2 is a fragmentary perspective view, looking downwardly upon the upper portion of the auger, illustrating the arrangement of the clips.

FIG. 1 illustrates a screw-like auger 10 having a curved or helical blade 11 mounted upon a shaft 12. Such an auger would typically be mounted within a trough or a tube and would be used for conveying material which is particulate or made of separate solid pieces, and also may be used for crushing or breaking such material. A use of such an auger, as mentioned above, is in the conveying and crushing of broken or crushed glass. However, these devices are used for other materials as well.

The forward or lead face of the auger blade, particularly near the edges, tends to rapidly wear and also to chip or break due to the abrasion and impact contacts with the material conveyed. To reduce the wear and impact breakage, a wear strip 15 is applied along the edges of the blade. The strip is formed of individual wear clips 16 which are aligned in a row, end-to-end, along the edge of the blade and welded thereto, including by means of weld material 17 in the gaps between the adjacent clips.

Figure 3:
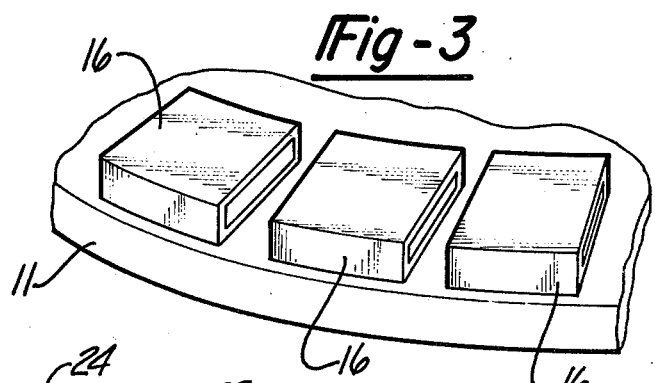
FIG. 3 is an enlarged, fragmentary, perspective view, of several clips on a portion of the blade.
Figure 4:
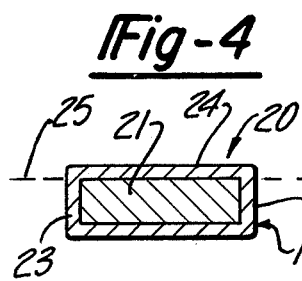
FIG. 4 is a cross-sectional view of a clip formed of a flattened tube.
Figure 5:
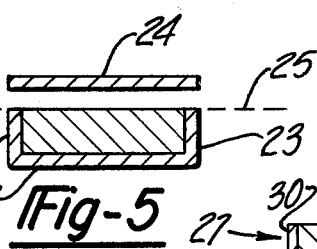
FIG. 5 is a view similar to FIG. 4, but showing one face of the tube removed.

As illustrated in FIGS. 3-5, the clips may be formed of a flat, thin wall steel tube 20. The wall thickness may vary considerably. By way of example, the wall thickness may be about one-sixteenth to one-eighth of an inch.

The tube is filled with a matrix 21 made of hard carbide particles, such as tungsten carbide or the like, surrounded by a soft, ductile, resilient brazing material, such as a conventional bronze brazing compound, but of the group which is relatively resilient. The brazing material fills the spaces between the carbide and also substantially surrounds the individual particles which are imbedded in the brazing material.

The tube provides a channel having a base 22 and low side walls 23, with the upper wall of the tube forming a cover 24 for the channel. Preferably, a long steel tube is filled with the matrix. Thereafter, the tube is cut into clip size lengths, as for example, approximately one inch in length. Thus, the clips, while varying considerably in size, would typically be in a range of about one inch square and a thickness of less than one-half inch.

The clips are aligned, end-to-end, as shown in FIG. 3. A slight gap appears between each adjacent pair of clips due to the curvature of the blade edge and the need to provide a space to receive the weld material 17. The weld material secures the weldable steel tube to the blade and also tends to form end walls for the otherwise open channels. These walls confine and hold the matrix material in place.

In use, the abrasion grinds off or wears off the upper cover wall 24 to the upper surface of the matrix, as indicated by line 25 in FIGS. 4 and 5. In FIG. 5, the upper wall 24 is shown as if cut off as one piece to indicate the opening of the channel so that the matrix is exposed.

The hard carbide particles may be of irregular size and shape within a wide range. By way of example, they may be in the range of between about four to forty mesh. Such particles are brittle and thus can be broken and also, dislodged from the surrounding matrix by sharp impact forces. This breakage is precluded by the relative movement of the particles under impact and by the soft, ductile, somewhat resilient nature of the brazing material which yields and tends to absorb impact forces. Thus, the matrix resists the breakage which otherwise could occur because of the impact forces applied from time to time upon the blade.

Figure 7:
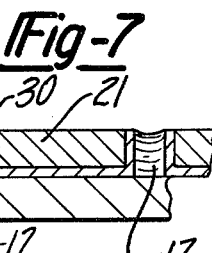
FIG. 7 is a cross-sectional view showing a row of several clips of the type illustrated in FIG. 6, upon a blade.
Figure 6:
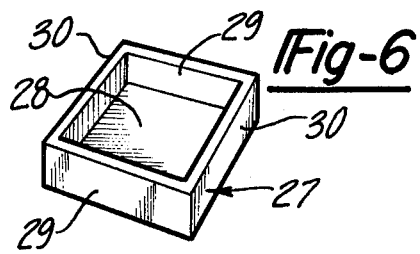
FIG. 6 is a perspective view of a tray-type channel clip.

The clips may be formed of box-like trays 27 as illustrated in FIGS. 6 and 7. These trays have a base 28, side walls 29, and end walls 30 between which the weld material 17 is deposited. The weld material is also deposited around the base and side walls, for securing the clips to the blade. This closed end channel provides a complete wall around the matrix to hold it and compact it.

Figure 8:
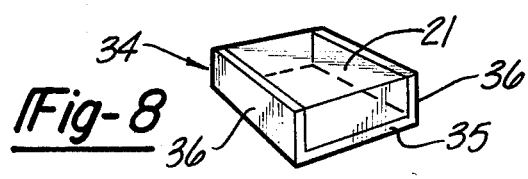
FIG. 8 is a perspective view of an open-ended channel type of clip.

FIG. 8 shows an open-ended channel 34, formed of sheet metal, with a flat base 35 and integral side walls 36. It is filled with the matrix and may be applied upon the blade edge either with the open ends facing towards each other or with the open ends facing radially outwardly and inwardly of the blade. In the first instance, the weld material forms the end walls to enclose the matrix. In the second case, the channel side walls 36 are welded together by the weld material deposited between them and the matrix is exposed radially outwardly of the blade to provide wear resistance in that area.

Figure 9:
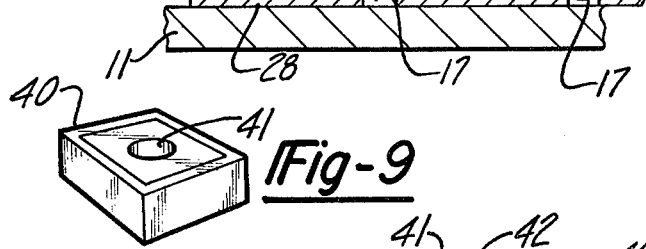
FIG. 9 is a modification wherein the clip is provided with a central hole.
Figure 10:
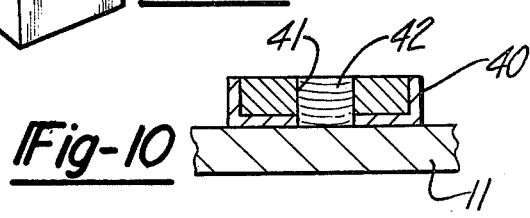
FIG. 10 is a cross-sectional view of the clip of FIG. 9, showing a plug weld fastening the clip to a blade.

FIGS. 9 and 10 illustrate another embodiment wherein the clips 40 are formed of either a tray as shown in FIG. 6 or may be formed of a channel as shown in FIG. 8. In either event, the clip is provided with a central hole 41 which extends through the metal channel and the matrix. When the clips are applied upon the blade surface, the holes are filled with weld material 42 to form a plug weld for fastening the clips in place. Additional welding around the clips or between adjacent clips may be used where necessary. Alternatively, such additional welding may be eliminated where its additional strength is not needed.

Having fully described an operative embodiment of this invention, I now claim:

1. Blade wear clips for attachment in an end-to-end aligned row upon the edge of the wear surface of a blade, such as a curved auger blade and the like, comprising:

each clip being formed of a roughly square, flat channel, made of a weldable, thin steel sheet-like material, having a base and opposite short legs to provide the channel cavity therebetween;

each channel cavity being filled with a matrix formed of packed together irregular size and shape hard carbide particles and a soft, ductile brazing type material filling the spaces between the particles and generally surrounding the particles, said clips being weldable upon the face of the blade in an aligned row adjacent the blade edge to provide a wear resistant strip;

and said particles being relatively movable within the matrix, under impact to the clips, so that despite said hard particles being brittle, said matrix and the particles are resistant to impact forces and impact breakage.

2. Blade wear clips as defined in claim 1, and said clips being formed of flattened tubes to provide the channel with an integral cover, which cover is ground off by abrasion with materials contacting the blade for thereby, exposing the matrix to such materials.

3. Blade clips as defined in claim 1, and said channels having integral end walls to provide a box-like shape.

4. Blade clips as defined in claim 3, and including an opening extending through the base of the channel and the matrix above it, for receiving welding material for plug welding the clips to the surface.

5. Blade clips as defined in claim 1, and said clips being arranged in spaced apart relationship relative to each other, and including weld material within the spaces between the clips for securing the clips together and to the blade surface.

6. Blade clips as defined in claim 5, and the ends of said clips being open, so that the weld material closes such ends and forms clip end walls for containing the matrix between such end walls.

7. In a wear resistant blade edge formed on a blade having a surface exposed to abrasion and impacts, such as a curved edge auger blade and the like, and a strip of hard carbide material secured upon the exposed surface to provide wear resistance, the improvement comprising:

said strip being formed of an end-to-end aligned row of small, flat clips that are gapped a short distance apart from one another;

each clip being formed of a weldable metal channel having a channel cavity filled with a matrix made of irregular shaped and sized hard carbide particles surrounded by a soft, ductile, somewhat resilient brazing material which fills the spaces between the particles;

said clips being welded to the surface, with the welding material also being applied in the gaps between the clips;

said matrix being resistant to abrasion wear and also, being resistant to breakage of the hard carbide particles, which are brittle, and of the matrix itself, by relative movement of the particles under impact forces and the brazing material tending to yield under and to absorb impact forces.

8. A construction as defined in claim 7, and the ends of said clips that face towards each other being open and said weld material forming an end wall between clips to hold the matrix of each clip.

9. A construction as defined in claim 8, and said clips being formed of a flattened tubes to provide the channel with an integral cover, which cover is removed by the abrasion with materials contacting the blade for thereby exposing the matrix to such materials.

* * * * *